United States Patent
Pan

(10) Patent No.: US 7,274,869 B1
(45) Date of Patent: Sep. 25, 2007

(54) SYSTEM AND METHOD FOR PROVIDING DESTINATION-TO-SOURCE PROTECTION SWITCH SETUP IN OPTICAL NETWORK TOPOLOGIES

(75) Inventor: Jin-Yi Pan, Westford, MA (US)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/449,575

(22) Filed: Nov. 29, 1999

(51) Int. Cl.
H04B 10/00 (2006.01)
(52) U.S. Cl. .............................. 398/5; 398/17; 398/19
(58) Field of Classification Search ............... 359/110, 359/128, 139, 173, 179; 398/2–5, 10, 12, 398/17, 19, 70–72
See application file for complete search history.

(56) References Cited

U.S. PATENT DOCUMENTS

| | | | | |
|---|---|---|---|---|
| 5,953,312 A | * | 9/1999 | Crawley et al. | 370/218 |
| 6,047,331 A | * | 4/2000 | Medard et al. | 709/239 |
| 6,151,304 A | * | 11/2000 | Doshi et al. | 370/238 |
| 6,366,584 B1 | * | 4/2002 | Gulliford et al. | 370/258 |
| 6,370,110 B1 | * | 4/2002 | Eslambolchi | 370/216 |
| 6,377,543 B1 | * | 4/2002 | Grover et al. | 370/227 |
| 6,430,150 B1 | * | 8/2002 | Azuma et al. | 340/825.01 |
| 6,496,476 B1 | * | 12/2002 | Badt et al. | 370/228 |

* cited by examiner

Primary Examiner—Dzung Tran
(74) Attorney, Agent, or Firm—Foley & Lardner LLP

(57) ABSTRACT

A system and method for establishing protection routes in optical mesh networks. A protection protocol is provided that utilizes a destination-to-source communication channel to establish a source-to-destination protection route. The communication channel is established from the node detecting the failed link back towards the transmitting node. As the destination-to-source communication channel is being established back towards the source node, it concurrently directs the nodes along this path to perform switching functions to subsequently allow the information originally intended for transmission via the failed link to be switched to the alternate protection path. Various manners of ascertaining the protection routes are also provided, including predetermined and/or dynamically-generated protection paths established via the destination-to-source communication channel.

38 Claims, 7 Drawing Sheets

SYSTEM AND METHOD FOR PROVIDING DESTINATION-TO-SOURCE PROTECTION SWITCH SETUP IN OPTICAL NETWORK TOPOLOGIES

FIELD OF THE INVENTION

The present invention relates generally to network communications systems, and more particularly, to a method and apparatus for establishing protection paths in optical networks from destination node to source node, to immediately avail alternate paths to source nodes of failed links upon the source node's notification of the link failure.

BACKGROUND OF THE INVENTION

The modern communications era has brought about a tremendous proliferation of wireline and wireless networks. Computer networks, television networks, and telephony networks in particular are experiencing an unprecedented technological expansion, fueled by consumer demand. The ever-increasing need for bandwidth has exceeded even the most perspicacious expectations, as the explosion of data and multimedia transmissions are breaking the seams of the networking infrastructure. This has propelled an intense effort to quickly increase the available communications bandwidth.

In line with this effort, various data transmission technologies have been employed and improved upon. Improved networking architectures and protocols over copper wires, radio waves and fiber-optic cable are helping in the effort to increase available bandwidth. Of late, optical data communication over the fiber-optic infrastructure is proving to be one of the most promising areas to assist in this effort. The fiber-optic cabling laid over the last couple of decades have traditionally been underused with respect to bandwidth. Essentially, this has been due to the failure to multiplex signals on a given fiber. For example, the first major use of optical fiber was a single-mode use where a single signal is transmitted through the fiber. In this mode, service providers quickly experience fiber exhaustion such that bandwidth can no longer be increased unless more fibers are installed.

Efforts have turned to modulation techniques used to transmit the optical signals. In order to increase bandwidth, wavelength division multiplexing (WDM) has been used to allow multiple signals to travel along a single fiber. Wavelength division multiplexing (WDM) is a technique where multiple signals having different wavelengths are launched on the same fiber and demultiplexed at the receiving end. Each optical signal is assigned to a frequency (wavelength) within a designated frequency band, and the individual signals are multiplexed onto a single fiber where they can be collectively amplified. The first such use was to allow two different signals at two different wavelengths to travel along a fiber, which essentially doubled the bandwidth available for each fiber. The original two-wavelength mode communicated optical signals at about 1300 nm and 1550 nm. This additional bandwidth, while beneficial, was very quickly devoured by the unforeseeably immense demand for bandwidth. It became apparent that further increases in bandwidth capacity would be necessary, and the focus turned to increasing the number of wavelength-modulated signals transmitted through the fiber. This effort has had some success using WDM technology, and is generally referred to as dense WDM (DWDM). Initially, WDM was employed in SONET (Synchronous Optical NETwork) or SDH (Synchronous Digital Hierarchy) systems, and is currently being implemented in true optical networks that utilize optical cross-connects and amplifiers to transmit optical signals over long distances without the need for electrical regeneration.

As the bandwidth of these optical links and networks increases, so does the need for restoring optical links in the event of a cable break or other impairment to fiber-optic communication. This network resilience is often accomplished by reserving a portion of the fibers in a particular configuration for restoration in the event of a working channel failure. The type of optical protection scheme employed may depend on the type of network architecture implemented. Linear structures, including one or more point-to-point WDM connections, as well as WDM ring and mesh structures are common types of network structures associated with WDM transmission technology.

In linear or point-to-point systems, the associated protection scheme monitors for a fault on the line, such as the loss of a signal. When this occurs, signals transmitted on the working line are switched so that they travel along a backup or "protection" line. For linear architectures, this can be done in a variety of ways, including 1+1 or 1:1 protection schemes. A 1+1 protection typically refers to an automatic protection switch based on pairing one working link with one backup link. The signal is transmitted in parallel on both links so that if the working link fails, the receiver node switches the connection from working to backup. A 1:1 protection refers to an automatic protection switch that is also based on a working link with a backup link, but the protected signals are not transmitted on both links in parallel. It is possible to send lower priority signals on the backup link. Where the working link fails, the protected signals will be switched from the working link to the backup link, and the lower priority signals on the backup link (if any) will be preempted. Protection for point-to-point connections is often referred to as "sub-network connection protection" (SNCP) because it is performed at the channel or link level, and not at the network level.

While these types of protection are generally used for linear topologies, they may also be used in other topologies such as ring and mesh topologies. When the optical channel (OCH) 1+1 protection is used in a ring topology, it is similar to the SONET UPSR protection scheme. 1+1 and 1:1 protection schemes require 100% spare bandwidth to backup the working link. Therefore, a shared protection scheme for ring or mesh topologies includes backup links that are shared by several working links. One example of the ring protection is optical multiplexer section shared protection ring (OMS-SPRING) that is similar to the SONET MS-SPRING. This is accomplished by reversing the line or switching multiplexed signals from the working line to a backup line. The signals will then travel around the ring and enter the target node from the opposite side.

However, in networks exhibiting other than a strict linear or ring topology, a signal may be faced with a variety of alternate protection routes if the working path fails. For example, "mesh" network topologies can become quite convoluted and may be comprised of various segments of ring and linear topologies. Even the simplest mesh network topology can be viewed as a ring topology with a central node connected to multiple nodes of the ring. For example, referring to FIG. 1, an example of a simple mesh network is illustrated. The network 10 includes nodes A 12, B 14, C 16 and D 18 respectively. Nodes A, B, C and D form a ring, and node E is a central node connected to each of the other nodes. This configuration forms a "mesh" network topology.

In the case of a ring topology, protection fibers form a ring analogous to the working ring. A signal transmitted along such protection fibers essentially has one physical route in which the signal can take, which is around the ring. In the case of a mesh topology, it can be seen from FIG. 1 that there are many different possible routes between any two given nodes. For example, if the working fiber from node A 12 to node B 14 to node D 18 were to fail between nodes A 12 and B 14, it must be determined what path the signal will take between node A 12 and node D 18 once transferred to the protection fiber. The signal could be transmitted along protection fiber from node A 12 to node E 20 to node D 18. Alternatively, the signal could be transmitted from node A to E to C to D, or A, C, D, and so forth. It can be seen that there are multiple routes between any given nodes in the network. As can be seen, an increase in the number of nodes and corresponding links in the mesh configuration causes an increasing number of potential routes between nodes.

The restoration of optical communication via protection paths in a mesh topology therefore requires consideration of the physical network topology. Further, the speed and efficiency in switching from working fibers to protection fibers must be considered to maintain high quality network resilience. In prior art mesh networks, protection paths consist of predetermined alternate paths, or real-time calculated alternate paths, which are set up after the source node recognizes that a link has failed. This requires that the source node first be notified of the link failure, and then requires the nodes along the alternate path to later be switched to allow the information from the failed link to be re-routed along the alternate path. The prior art requires the source node to send the switching request over the signaling or supervisory channel to the nodes along the alternate path. The source node may request the acknowledgement information from the nodes relating to the switch status or availability. This time-consuming and inefficient process adversely affects recovery time.

It would be desirable to have a system and method for providing efficient and flexibility of routing within the network of protection fibers where there are multiple available routes in which the optical signal may travel. The present invention provides a solution to the aforementioned and other shortcomings of the prior art, and offers additional advantages over existing prior art technologies.

SUMMARY OF THE INVENTION

The present invention is directed to a system and method for efficiently establishing protection routes in networks, more particularly in WDM optical mesh networks. The invention provides a new protection protocol that utilizes a destination-to-source communication channel to establish the source-to-destination protection route. The communication channel is established from the node that detected the failed link back towards a transmitting node on the opposite side of the failed link. The node detecting the failure can be any one of nodes after the failed link, including the final destination node. Similarly, the transmitting or source node can be any one of the nodes before the failed link, including the source node at which the information transfer was originated. As the destination-to-source communication channel is being established back towards the source node, it concurrently directs the nodes along this path to perform switching functions to subsequently allow the information originally intended for transmission via the failed link to be switched to the alternate protection path. Therefore, by the time the source node is notified of the link failure, the protection path is already set up and prepared to allow the information to be switched onto the newly-established protection path, thus bypassing the failed link. The invention further provides flexibility in the protection routes taken, allowing predetermined and/or dynamically-generated protection paths to be established via the destination-to-source communication channel.

In accordance with one embodiment of the invention, a method is provided for establishing a protection path for a failed link between first and second nodes in a mesh network, where the failed link causes a disruption in the transfer of information from the first node to the second node. The method includes establishing an alternate path from the second node to the first node via a destination-to-source communication channel. The destination-to-source communication channel is established through one or more alternate nodes beginning at the second node and ending at the first node. A switch function is executed at each of the alternate nodes traversed by the destination-to-source communication channel, to allow source-to-destination information traffic flow from the first node to the second node along the alternate path defined by the destination-to-source communication channel. The information traffic flow originally intended for transmission via the failed link is switched to the alternate path at the first node when the destination-to-source communication channel is established at the first node.

In accordance with another embodiment of the invention, a network protection configuration for use in optical mesh network topologies is provided, and is used to reroute optical signals from a failed transmission path to one or more alternate transmission paths. The network protection configuration includes an optical fiber network having a plurality of optical network nodes, where each of the optical network nodes is coupled within the network to transmit and receive optical signals carried on distinct wavelengths on optical fibers of the network. Among the optical nodes is a source node attempting to transmit the optical signals via the failed transmission path, and a destination node that detects the failed transmission path. A communication channel is established from the destination node to the source node to transmit a path failure notification. The route established by the destination-to-source communication channel traversing one or more of the optical network nodes defines the alternate transmission path. The network nodes that define the alternate transmission path are switched in response to the path failure notification, in order to facilitate source-to-destination transmission of the optical signals from the failed transmission path along the alternate path.

In yet another embodiment of the invention, a method for establishing a protection path for a failed optical link between a source node and a destination node in an optical WDM mesh network is provided, where a transfer of optical signals from the source node to the destination node is suspended by the failed optical link. The failed optical link is detected at the destination node by recognizing the loss of optical power at destination node cross-connect ports. A link failure signal is transmitted via a communication channel from the destination node detecting the failed link to the source node through alternate nodes. A cross-connect switch is configured at each of the alternate nodes receiving the link failure signal, where the cross-connect switch facilitates cross-connecting input ports to output ports such that a source-to-destination protection path for transmitting the suspended optical signals is established contemporaneously with the transmission of the link failure signal from the destination node to the source node. The suspended optical signals are switched from the failed optical link to the source-to-destination protection path upon receipt of the link failure signal at the source node. In this manner, the source-to-destination protection path is set up using a destination-to-source communication channel.

The above summary of the present invention is not intended to describe each illustrated embodiment or implementation of the present invention. This is the purpose of the figures and the associated discussion which follows.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is generally directed to a system and method for efficiently establishing protection routes in mesh network topologies, and more particularly in WDM mesh networks. The invention includes a new protection protocol that uses a communication channel to set up the protection route from the node detecting the failure back towards the transmitting node of the failed link. The node detecting the failure can be any one of nodes after the failed link, including the final destination node. Similarly, the transmitting or source node can be any one of the nodes before the failed link, including the source node at which the information transfer was originated. The communication channel transmits a notification that the link has failed back to the source node, and concurrently directs the nodes along the way to perform the required switching functions. In this manner, by the time the source node is notified of the link failure, the protection path is already set up and prepared to allow the information to be switched onto the newly-established protection path and thus bypass the failed link.

The invention further provides flexibility in the protection routes taken, by allowing predetermined and/or dynamically-generated protection paths to be set up from the destination node back to the source node. Here, again, the destination node can be any one of the nodes after the failed link and the source node can be any one of the nodes before the failed link. This provides for highly efficient and adaptable protection for mesh network topologies.

Figure 1:
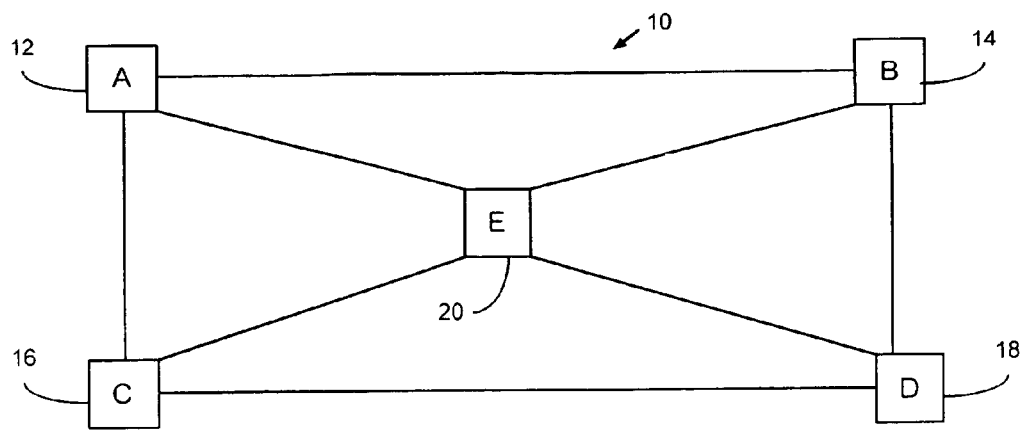
FIG. 1 is an example of a prior art mesh network topology.
Figure 2:
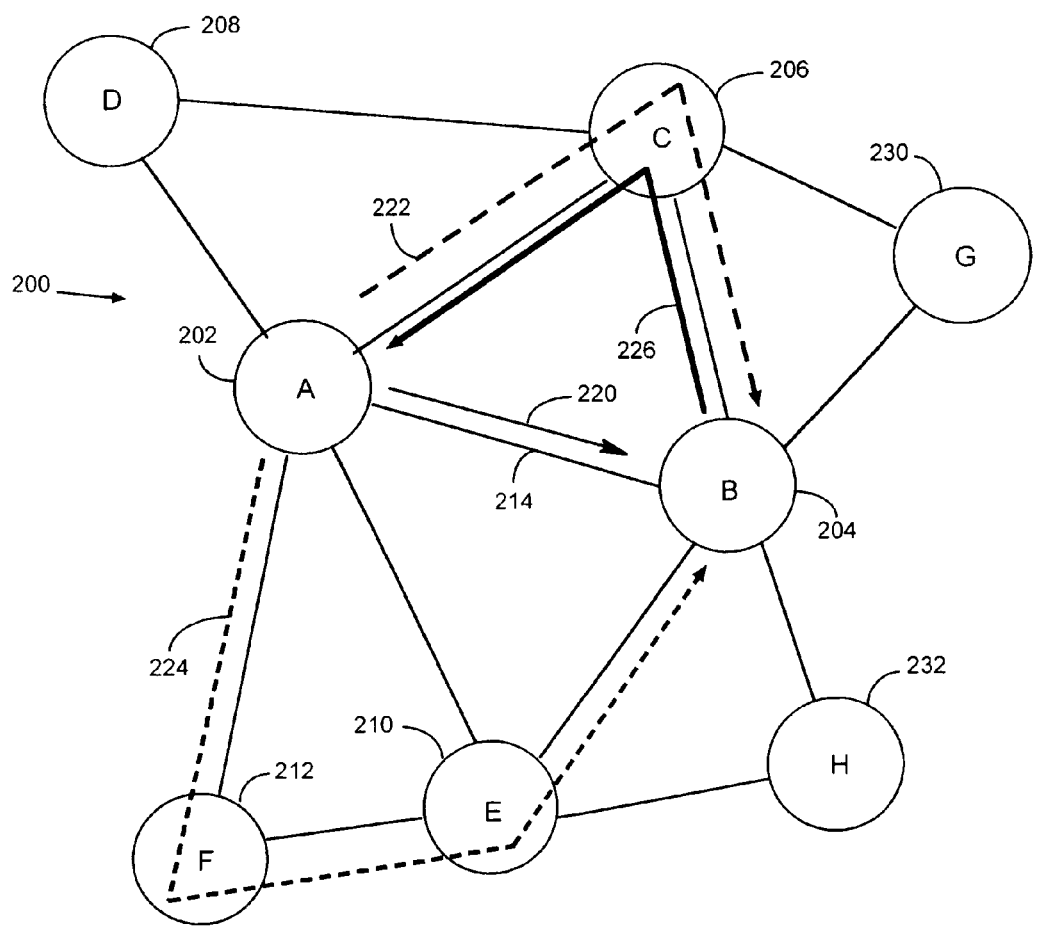
FIG. 2 is an illustration of an example network diagram capable of incorporating the principles of the present invention.

FIG. 2 is an illustration of an example network diagram capable of incorporating the principles of the present invention. The network 200 is merely provided for explanatory purposes, and the present invention is applicable in any network configuration where a plurality of potential routes between particular nodes are available for signal restoration. The network 200 represents a generic mesh network in which the present invention may be applied, and assists in identifying certain aspects of the invention.

The example network 200 includes a plurality of network nodes, including node-A 202, node-B 204, node-C 206, node-D 208, node-E 210, node-F 212, node-G 230 and node-H 232. As will be readily apparent to those skilled in the art, the network 200 is configured in a mesh topology. Each node is connected to other nodes by way of "links," which are direct connections between two adjacent nodes. For example, the connection 214 between node-A 202 and node-B 204 is a link. When information is to be sent from one node to another, the sending node is referred to as the source node (e.g., node-A 202) and the destination node is the node that is to receive the information (e.g., node-B 204). When the working path is fully operative, information sent by a source node will be received at the destination node, as illustrated by signal path 220. If the working path is faulty, e.g., has been cut or otherwise rendered inoperative, the present invention will switch the signals to protective fibers on one or both of a primary and a generated alternate path. In one embodiment of the invention, a primary path refers to a pre-defined protection path that routes the signals to the destination via a route other than the original working path. The primary path may be preconfigured, so that no computation need be performed to determine the primary path route. An example of a primary path can be seen in FIG. 2, such as the primary path 222 which is preconfigured to send signals along a predetermined path from node-A 202 to node-C 206 to node-B 204. The generated alternate path is a protection path dynamically configured based on the switch condition, route capacity, and availability. In accordance with one embodiment of the invention, the generated alternate path used look-up tables to compute the route. One such alternate path is illustrated as the alternate path 224, dynamically configured to send signals along a path from node-A 202 to node-F 212 to node-E 210 to node-B 204. Also associated with the present invention, and described in greater detail below, is a communication channel illustrated as channel 226, which is the channel on a specific wavelength that carries management information between nodes.

The present invention is applicable in mesh network configurations, particularly where using WDM/DWDM technologies. In accordance with the present invention, each optical node in the network is assigned a node address. The optical node address provides a unique identification for each of the optical nodes in the network. The optical node address table keeps the node address and status for a predetermined number of subsequent hops, such as at least the next two hops. A hop represents a transmission of information through a node router in a network of interconnected segments or subnetworks. A communication channel is provided in each fiber, and the communication channel is terminated at each node where the fiber is terminated. Further, in each link, there are a plurality of spare fibers. For example, to obtain 100% recovery, the total number of spare fibers in all routes from the source to the destination is greater than or equal to the number of the total fibers in the broken cable. All nodes on the primary and alternate paths are equipped with fiber and optical cross-connects, which is explained in greater detail below.

Figure 3:
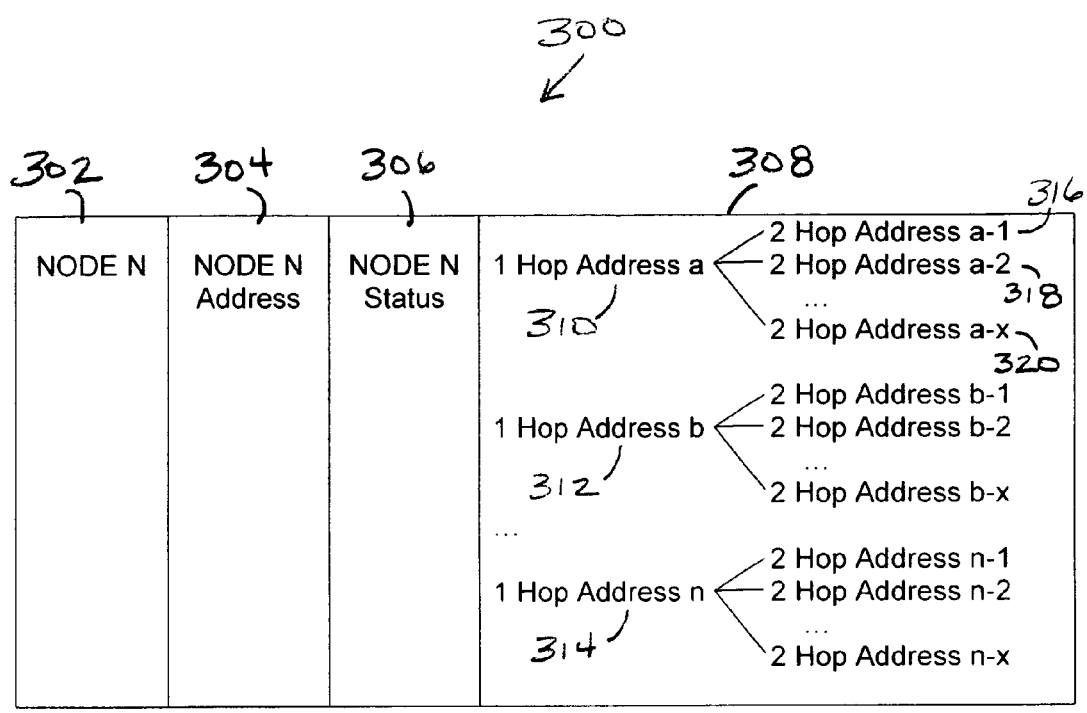
FIG. 3 is an example optical node address table in accordance with the present invention.

An example optical node address table 300 is illustrated in FIG. 3. Each optical node includes an optical node address table such the table 300 illustrated in FIG. 3. The manner in which the table is arranged or the number and type of additional fields in the table is not relevant to the present invention. Therefore, the table 300 of FIG. 3 is for illustrative purposes only, and is used to depict certain fields in one exemplary optical node address table.

The particular node is identified in table 300 by field 302. Generally, a field is not required to identify the node, since each node may have its own table and the node's identity is therefore self-evident. For purposes of this example, however, the node is identified in field 302, and is shown as node N, which represents any particular node in the network. For example, node N can represent node A 202 of FIG. 2.

Each node is assigned an address, depicted by node address field 304. As indicated above, each optical node has an address. Further, as described more fully below, each port of the fiber cross-connect and the optical cross-connect is associated with a node address connected to that fiber or optical cross-connect port. This node address that corresponds to ports of the fiber and optical cross-connects is the address represented in field 304. Each node may also retain status information relating to that node (including but not limited to fiber utilization, capacity, node availability, etc.), which is represented by field 306 of table 300.

In one embodiment of the invention, the optical node address table stores at least the next two hops' node addresses and corresponding status. The next hop refers to the direct links from the particular node to other surrounding nodes. For example, referring briefly to FIG. 2, the next hop from node A 202 would include nodes B 204, C 206, D 208, E 210 and F 212. Each of these nodes is directly linked to node A 202 and is therefore one "hop" away from node A 202. A second hop from this surrounding node group is therefore two hops away from the subject node. For example, node G 230 is one hop from nodes B 204 and C 206, but is two hops from node A 202. Similarly, node H 232 is one hop from nodes B 204 and E 210, but is two hops from node A 202. In one embodiment of the invention, the optical node address table, such as table 300, keeps track of address and status information for nodes within at least two hops of the subject node. Each optical node therefore stores the address and status information for the optical nodes surrounding it, and in one embodiment of the invention this is performed for the surrounding optical nodes within two hops of the subject optical node. As will be described more fully below, a desired path can be calculated when necessary to transmit information using the next two hops addresses and status information.

Table 300 of FIG. 3 includes field 308, which represents the above-described storage of the next two hops' address and status. Each of the node address/status items 310, 312 through 314 represent nodes that are one hop away from node N (hereinafter referred to as one-hop nodes). Each of the one-hop nodes 310, 312 through 314 is one hop away from a number of other optical nodes that are two hops away from node n. For example, the one-hop node 310 is one hop away from additional optical nodes 316, 318 through 320 (hereinafter referred to as two-hop nodes) and are therefore two hops away from node n. Each of the one-hop nodes may be associated with one or more two-hop nodes, as illustrated in FIG. 3. In this manner, the optical node address table 300 maintains a listing of the addresses and status of nodes within two hops of the subject node (i.e., node n). Additional levels of hops may also be retained in the optical node status table if desired, however in one embodiment the node addresses and status for the next two hops of nodes sufficiently facilitates the requisite path calculations.

Figure 4:
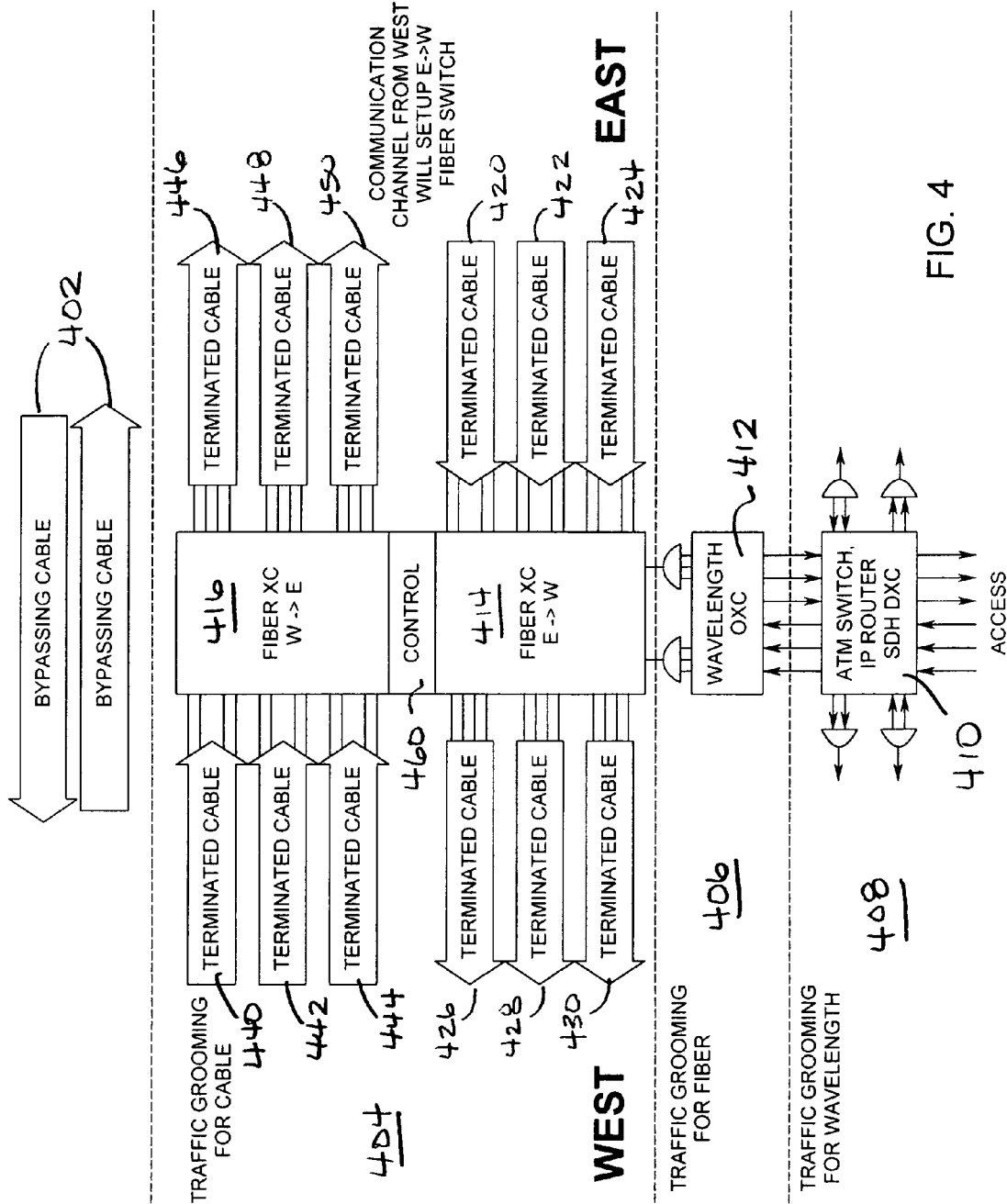
FIG. 4 is a block diagram of one embodiment of a network node used in connection with the principles of the present invention.

FIG. 4 is a block diagram of one embodiment of a network node 400 used in connection with the principles of the present invention. The node 400 may include bypassing fiber cables 402 which are not switched at the node 400. A fiber cross-connect (FXC) section 404 allows fibers to be cross-connected between different cables. An optical cross-connect (OXC) section 406 allows certain wavelengths or "channels" to be cross-connected between different fibers. The switching/routing section 408 aggregates various data signals into a high-speed optical channel. This is described more fully below.

Node section 408 performs wavelength traffic grooming. In this section, the lower-speed signals enter a switching/routing module 410, such as an asynchronous transfer mode (ATM) switch, internet protocol (IP) router or synchronous digital hierarchy (SDH) digital cross-connect (DXC). An ATM switch can switch ATM packets from one path to other paths in the network. An IP router generally refers to a device that performs the network layer forwarding function of the Internet protocol suite. An IP router is often distinguished from other sorts of packet switching devices in that a router examines the IP protocol header as part of the switching process. It generally removes the link layer header received with a message, modifies the IP header, and replaces the link layer header for retransmission. Similarly an SDH DXC allows for electronic traffic switching. These are examples of the types of switching and routing functions that may occur in node section 408, but is not limited thereto. These switching and routing functions are those involved with the interface to other systems, such as desktop systems. Node section 408 thus refers to the section of the node that grooms standard digital traffic into optical signals transmitted at certain wavelengths, and the particular format of the incoming application signals is not limiting to the present invention.

Signals from the switching/routing module 410 are combined to form an aggregate optical signal. In one embodiment, signals at module 410 grooms the traffic into high-speed optical signals, such as OC-48 operating at approximately 2500 Mbps, and modulates them onto a single wavelength. This function is referred to as "traffic grooming for wavelength" at node section 408 of FIG. 4. Modulating signals into an optical channel is known to those skilled in the art.

Node section 406 includes an optical cross-connect (OXC) 412, which manages all of the high-speed wavelengths from node section 408. Node section 406 performs optical cross-connect functions in order to switch certain wavelengths onto the desired fiber, and therefore is referred to as traffic grooming for fiber. The OXC 412 therefore locates the appropriate destination fiber for a particular wavelength, and switches the wavelength onto that fiber.

While some optical technologies transmit only one optical signal in a fiber, one fiber typically transmits multiple optical signals, each in a different optical channel. In the event of a failure, it is possible that an entire cable has been damaged or broken, a fiber within a cable has been damaged or broken, or that only one or more channels within a particular fiber have failed. Where only certain channels within a fiber have failed (laser failure, etc.), it is not necessary to switch the entire fiber onto a protection fiber since many of the channels are still operative. In this case, the OXC switches the faulty wavelengths from the failed link to another link by switching the failed wavelength to a different fiber. The OXC also allows certain signals on particular wavelengths to be switched from one destination to another by switching the wavelengths from one destination fiber to another destination fiber. For example, a fiber may transmit sixteen wavelengths from New York to Chicago, where half of the wavelengths are ultimately destined for Minneapolis and half are destined for San Francisco. The OXC 412 at the node 400 in Chicago switches half of those wavelengths onto a fiber destined for Minneapolis, and switches the other half onto a fiber destined for San Francisco. In this manner, optical routing, and rerouting in the event of a failure, are accomplished using the OXC 412 at node section 406. Failures at the wavelength level are channel cross-connected at node section 406 by the OXC 412, as compared to node section 404 which cross-connects entire fibers. The OXC 412 therefore has a port for each of the channels in the fiber to which it cross-connects, where the fiber cross-connects (FXC) 414, 416 has one port for each fiber, allowing all channels of the fiber to be cross-connected to another fiber, such as a protection fiber.

Node section 404 illustrates one example of the traffic grooming for the cable. As illustrated in FIG. 4, one FXC 414 is provided for traffic moving through the node in a first direction, depicted as east to west for purposes of example. Example cables 420, 422 and 424 are terminated at the FXC 414 handling the east-to-west cross-connect. As will be appreciated by those skilled in the art, any number of cables may be terminated at the FXC 414, and the three cables 420, 422 and 424 are depicted for illustrative purposes only. The FXC 414 can switch the signals on a fiber, on a fiber-by-fiber basis, onto other fibers in cables 426, 428 and 430. In this manner, the signals from a particular fiber can be switched/routed to a desired destination. Further, signals from failed fibers can be switched to other fibers having available capacity.

The exemplary node 400 is a bi-direction node, and therefore traffic may also move through the node in a second direction, depicted as west to east for purposes of example. Example cables 440, 442 and 444 are terminated at the FXC 416 handling the west-to-east cross-connect to cables 446, 448 and 450. Again, the particular number of fibers and cables associated with the FXC 416 depends on the particular application and use, and the number of fibers and cables depicted in FIG. 3 is for illustrative purposes only.

Each fiber cable (e.g., 420, 422, 424, 430, etc.) typically carries multiple fibers, often on the order of 250 fibers per cable for large networks connecting cities. When a cable has been completely or partially damaged or cut, those faulty fibers are switched onto different fibers. At times, the cable may include spare fibers so that faulty fibers may be switched onto other fibers in the same cable to the destination. At other times, the fiber may need to be switched onto a different cable and rerouted. For example, if the entire cable is cut, all of the traffic from the fibers of that cable may need to be rerouted through a different city, and may also require changing the direction of the traffic. If, for example, the cable 446 were cut, all optical signals from all fibers may need to be switched from the west-to-east traffic to the east-to-west traffic, which is facilitated by the control circuitry 460.

The FXC 414 and 416 therefore allows failed or broken fibers to be switched onto different fibers in different cables, rerouted through different nodes, and ultimately to the desired destination. Available nodes, cables and fibers must be ascertained in order to properly switch failed signals to different wavelengths, fibers and cables. As will be described in greater detail below, the present invention facilitates the path setup for such optical network protection in an efficient manner.

The present invention provides a new protection protocol for a network, such as a WDM mesh network, that uses a communication channel to set up a protection route through nodes such as the nodes described in connection with FIG. 4. The invention sets up the protection route from the node detecting the failure back towards the transmitting node. This "backwards" protection scheme is hereinafter referred to as the Backward Protection Switch Setup (BPSS) protocol.

In accordance with the present invention, primary and alternate paths for rerouting data are provided, and described in greater detail below. While the primary and alternate paths are described in greater detail below, the exemplary node architecture of node 400 is provided in both the primary and alternate paths, such that the nodes in the primary and alternate paths are equipped with both fiber and optical cross-connects.

In prior art ring architectures, a failure of a link typically causes signals to be switched from working fibers to protection fibers in a predetermined manner, such as in OMS-SPRING (optical multiplexer section shared protection ring) technologies. In such a case, signals are switched to the protection fibers in the ring so that the source node is switched to some operative link in a fixed manner. Failed links are merely rerouted in the reverse direction around the link on the protection fibers until the signals reach the destination from the opposite direction at the destination node. However, current architectures are continually moving more towards mesh architectures and an efficient manner of setting up alternate paths in the event of one or more link failures is needed.

In accordance with the present invention, a protection protocol for mesh technologies is provided where the paths are set up from the destination node to the source node. By the time the source node is notified of the failure, a new path for its forward transmission of the data will have been set up by the system in the reverse or "backwards" direction (i.e., from the destination node to the source node). Alternative manners of ascertaining the new path are provided, including embodiments using primary fixed alternate paths and embodiments using secondary dynamic alternate paths. The primary path is a predefined protection path that may be used to reroute the information from the failed link(s), and the alternate (i.e., secondary) paths are protection paths based on route capacities and availability as determined by the backwards setup protocol and through the use of an optical node address table such as described in connection with FIG. 3. In either case, the protection path is setup from destination node to source node using the communication channel as described below.

It should be recognized that for purposes of the following examples the "source node" refers to the actual source node that initiated an information transfer, and the "destination node" refers to the node to which the information is targeted. These designations are for illustrative purposes and is useful in obtaining an understanding of the invention. However, the present invention is equally applicable where the failed link is not a direct link between the node originating the information transfer and the node to which the information is targeted. For example, a node may originate an information transfer to a targeted destination node where the information traverses multiple nodes between the originating node and the targeted node, but only one or more of the links along this path fails. In these cases and in accordance with the present invention, the node detecting the failure can be any one of the nodes after the failed link, including the final, targeted destination node. Similarly, the transmitting or "source node" can be any one of the nodes before the failed link, including but not limited to the actual node that initiated the information transfer. Therefore, to the extent that descriptions herein refer to the "source node" as the node originating the information transfer, and refer to the "destination node" as the node to which the information is targeted, it should be understood that this is merely for ease of explanation and is not a limitation of the present invention.

Figure 5:
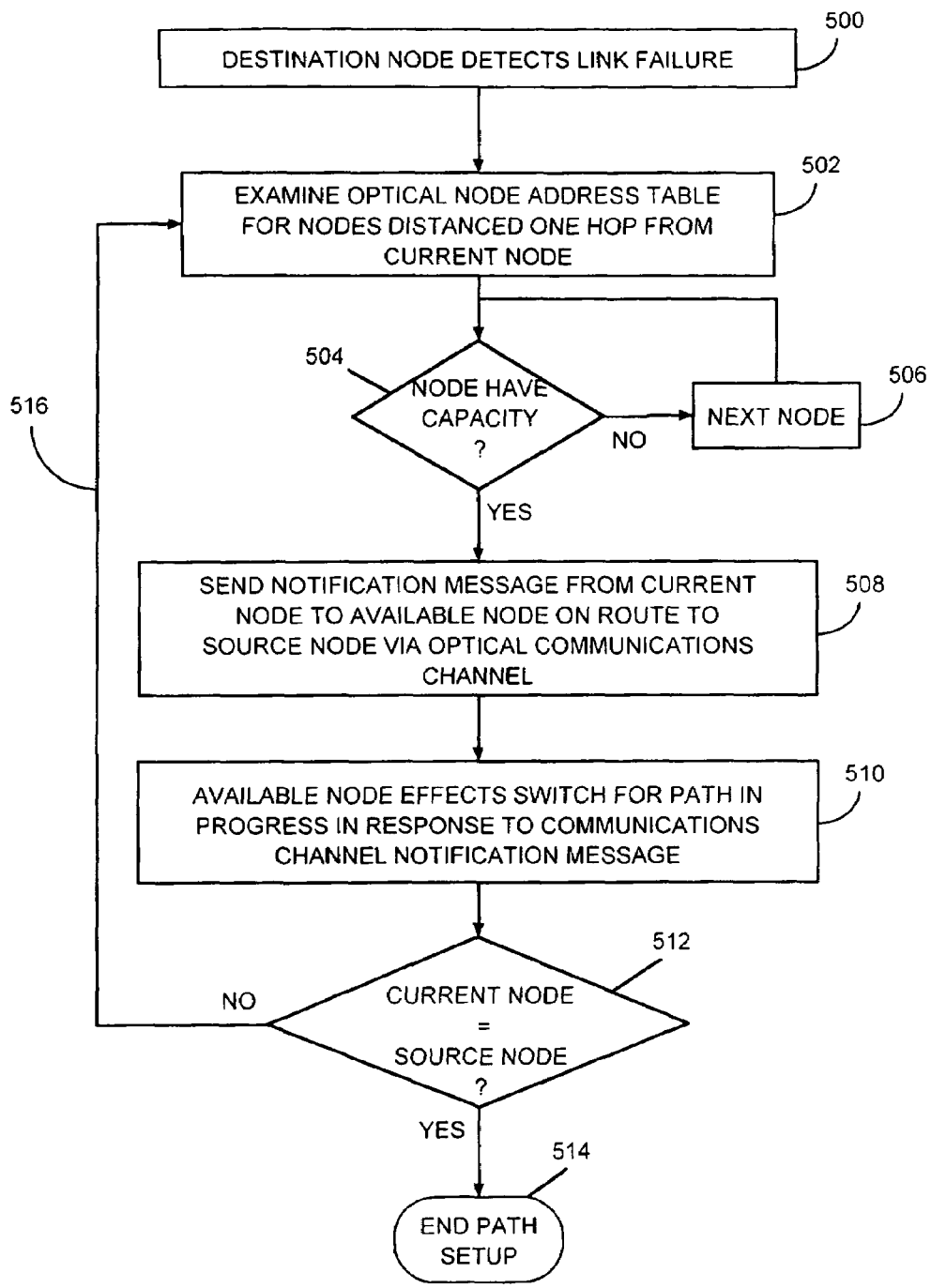
FIG. 5 is a flow diagram illustrating one embodiment of a Backward Protection Switch Setup (BPSS) protocol using dynamic path generation in accordance with the principles of the present invention.

Referring now to FIG. 5, a flow diagram illustrating one embodiment in accordance with the present invention of a Backward Protection Switch Setup (BPSS) protocol using dynamic path generation is provided. The destination node detects 500 a link failure. In one embodiment, a node to which information is directed monitors for a valid connection at each optical port. As described above, other nodes after the failed link but before the node to which the information is targeted can also detect the link failure. For example, an intermediate node between the source node initiating the information transfer and the destination node to which the information is targeted may be positioned in the network such that the link failure is recognized by this intermediate node as the information attempts to reach the ultimate destination node. In this case, the intermediate node can detect the link failure. These intermediate nodes are generally "destination nodes" for the information transfer, even though they might not be the final targeted destination node. Therefore, for purposes of this description, the destination node may be any node after the failed link, including but not limited to the final destination node to which the information is ultimately targeted.

The optical channel at the particular "destination node" port continuously monitors for optical signals, and if a loss of optical power at that particular cross-connect port occurs, the destination node recognizes that it cannot receive optical signals via that port. This is indicative of a link failure, such as a fiber cut or break. In such a case, the destination node recognizes a "no signal" failure which may set a flag or alarm to indicate that it did not receive any optical power from the fiber. Other manners of detecting a link failure may also be used in connection with block 500 while remaining within the scope and spirit of the invention.

Upon detecting a link failure at a destination node, the optical node address table at that node is examined 502. Nodes that are one hop away from the current node (the destination node detecting the failure in this example) are viewed for status in the optical node address table. As previously discussed, particularly in connection with FIG. 3, the optical node address table at a particular node maintains the status for the next predetermined number of hops, which includes the next one hop. The status of the nodes one hop away from the current node indicates whether any of these nodes have available capacity to allow information from the failed link to be rerouted therethrough. If a first node viewed does not have capacity as determined at operation 504, the status of the next node 506 is examined, and this continues until one or more nodes one hop away from the current node are found to have the requisite available capacity. It should be recognized that the determination of available nodes does not have to occur in a serial fashion as illustrated by the flow diagram, and the manner illustrated in the flow diagram is for illustrative purposes only. For example, the status of the "one-hop" nodes could alternatively be viewed in parallel and selected accordingly. The particular one or more nodes chosen can be the first node(s) discovered to have available capacity, the nodes having the most available capacity, or any other predetermined criteria desired. In one particular embodiment, the available capacity is determined based on the available capacity of the next two hops. For example, it may be more desirable to select a one-hop node having capacity where its next one-hop node(s) also has sufficient capacity. In another embodiment of the invention, the one-hop nodes are examined, and the first one to exhibit sufficient available capacity is selected. In yet another embodiment, a predetermined path is defined such that when a destination node detects a link failure, the particular one-hop node is identified in advance, and if it has available capacity, it is identified as the current available node. This embodiment is described in greater detail in connection with FIG. 6.

When the available node (one hop from the current node) has been identified, a notification message is sent 508 from the current node to the available node via the optical communication channel. The notification message identifies the occurrence of a failed link, and is sent from node to node destined for the source node. Thus, the notification message is transmitted via the optical communication channel from the destination node back to the source node via available nodes discovered along the way to the source node. As described above, other nodes before the failed link but after the source node that originated the information transfer can also represent the "source node" for purposes of receiving the notification message and switching to an alternate path. For example, an intermediate node between the source node initiating the information transfer and the failed link may be positioned in the network such that the alternate path switch need only go back as far as this intermediate node prior to the link failure. Because the switching function need only be routed around the failed link(s), the "source node" for purposes of this description represents any node before the failed link, including but not limited to the source node initiating the information transfer. These intermediate nodes are generally referred to as "source nodes" for purposes of this description, as they are sourcing the information prior to the failed link.

As the notification message is transmitted along the communication channel from the destination to the source node along the alternate path, the available node performs a switch within the node to subsequently allow the information to be transmitted forward from the source to the destination node along this same path. This is depicted at operation 510. As the notification message is being transferred backwards from destination to source, the nodes are set up to subsequently allow the forward transmission of the information originally intended to be transmitted along the failed link. Thus, by the time the notification message reaches the source node to notify the source node of the link failure, the new optical transmission path will already be set up, thereby allowing the information to immediately be rerouted to the destination node.

Each node performs this switch setup, and the process continues until the notification message is passed along back to the source node (i.e., a node prior to the failed link, including but not limited to the source node originating the information transfer). This is depicted at decision operation 512, where it is determined whether the current node (the node corresponding to the furthest backwards progression of the notification message along the communication channel) is the source node. If so, the BPSS path setup is complete 514. Otherwise, the process continues as seen by return path 516.

Figure 6:
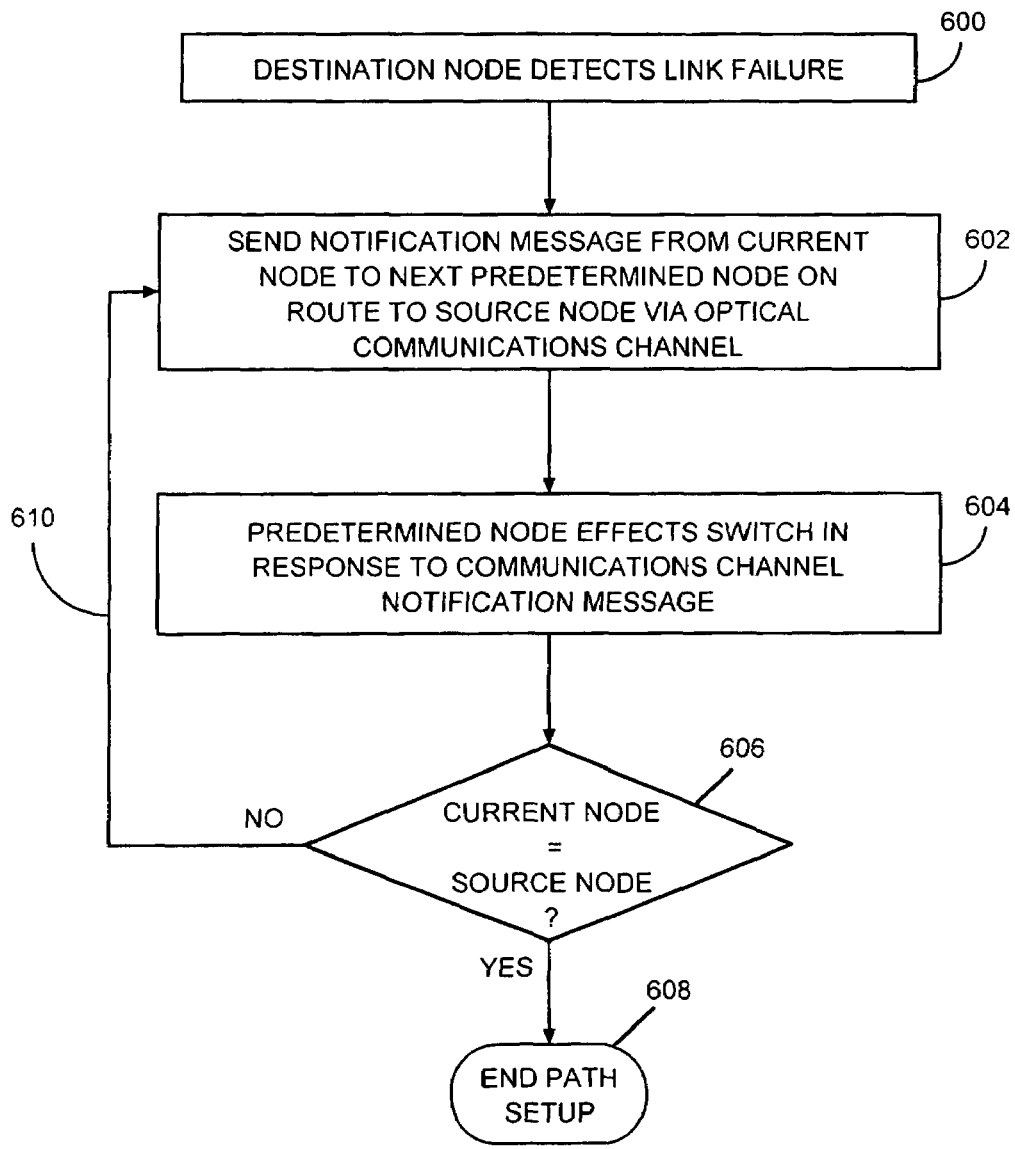
FIG. 6 is a flow diagram illustrating one embodiment of a Backward Protection Switch Setup (BPSS) protocol using predetermined path in accordance with the present invention.

FIG. 6 is a flow diagram illustrating one embodiment in accordance with the present invention of a Backward Protection Switch Setup (BPSS) protocol using a predetermined or "fixed" path. The destination node detects 600 a link failure which can be accomplished in a manner as previously described in connection with FIG. 5. Upon detecting a link failure at the destination node, no table look-up function is required for this particular embodiment. In this embodiment of the invention, a predetermined path, referred to as the primary path, is selected in advance. The primary path is a predetermined alternate path that is used in the event of a link failure. For example, referring briefly to FIG. 2, a link failure between node A 202 and node B 204 may occur where node B 204 is the destination node that detected the link failure. The "primary" backup path is shown as primary path 222 which is preconfigured to send signals along a predetermined path from node-A 202 to node-C 206 to node-B 204. Although the path is predetermined with respect to the alternative route that will be taken, notification messages are still sent backwards from the destination node to the source node via the communication channel 226 in order to set up the switches along the nodes of the primary alternate path. This can be seen at operation 602, where a notification message is sent from the current node to the next predetermined node on route to the source node via the optical communication channel. This notification message is sent from node to node, destined for the source node (i.e., a node before the failed link including, but not limited to, the source node originating the information transfer), albeit along an alternate path selected in advance. Thus, the notification message is transmitted via the optical communication channel from the destination node back to the source node via predetermined nodes.

As the notification message is transmitted along the communication channel from the destination to the source node, each node along the way performs a switch within the node to subsequently allow the information to be transmitted forward from the source to the destination node. This is depicted at operation 604. As the notification message is being transferred backwards from destination to source along a predetermined path, the nodes are set up to subsequently allow the forward transmission of the information originally intended to be transmitted along the failed link. Thus, by the time the notification message reaches the source node to notify the source node of the link failure, the new optical transmission path will already be set up, thereby allowing the information to immediately be rerouted to the destination node.

Each node performs this switch setup, and the process continues until the notification message is passed along back to the source node. This is depicted at decision operation 606, where it is determined whether the current node is the source node. If so, the BPSS path setup is complete 608. Otherwise, the process continues as seen by return path 610.

Figure 7:
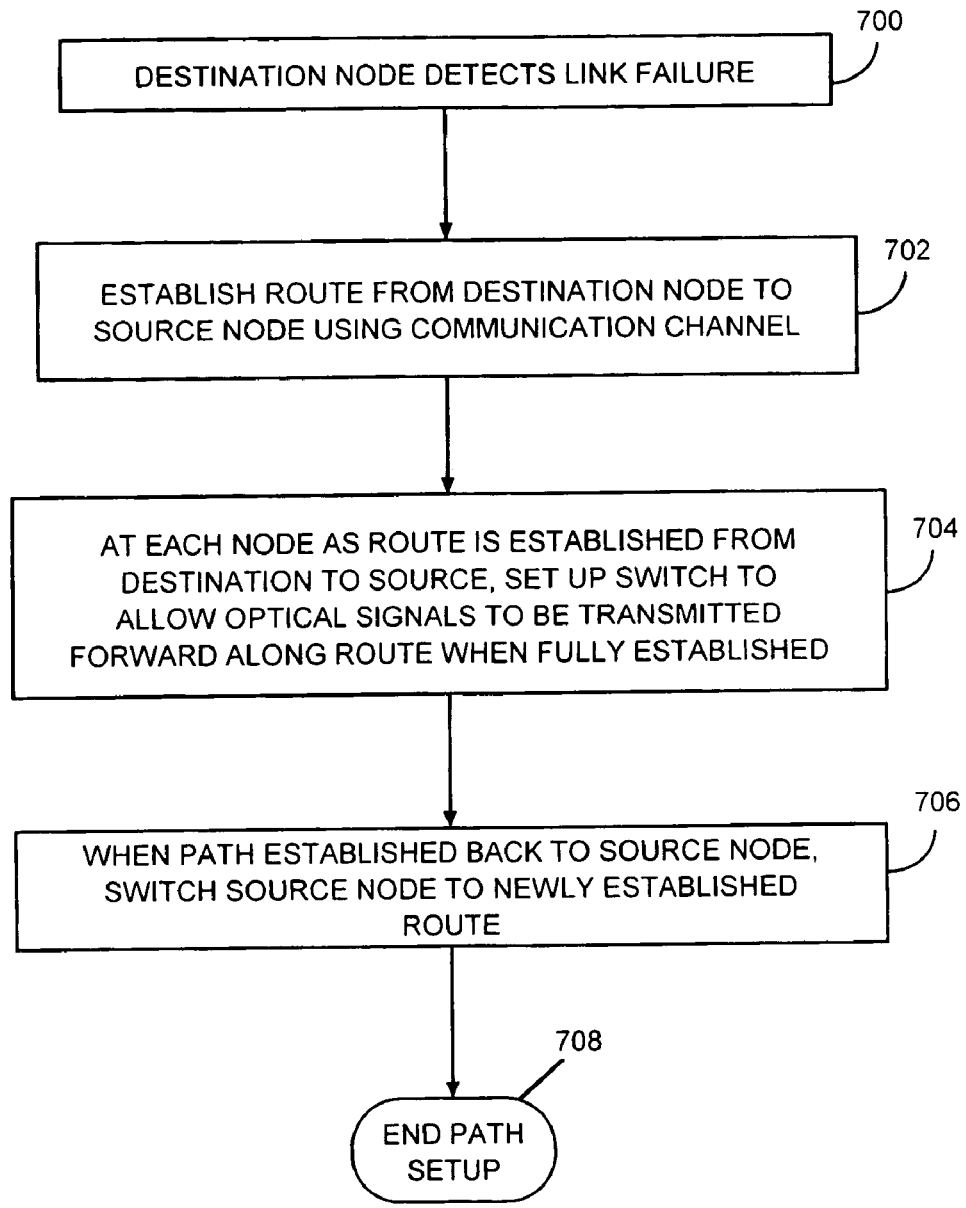
FIG. 7 is a flow diagram illustrating the Backward Protection Switch Setup (BPSS) protocol independent of the manner of selecting the alternate optical path.

FIG. 7 is a flow diagram illustrating the Backward Protection Switch Setup (BPSS) protocol independent of the manner of choosing the new, alternate optical path. This embodiment illustrates one aspect of the invention where an alternate route for optical signals moving from source to destination is setup through use of the communication channel from destination to source, but is independent of the manner of determining the precise route that will be taken (i.e., predetermined path, dynamically-generated path, etc.) This concept of the invention is applicable regardless of the manner of selecting the alternate route.

The destination node (i.e., a node after the link failure including, but not limited to, the final destination node to which the information is destined) detects 700 a link failure. Such detection can be accomplished as was described in connection with FIG. 5. Upon detection, a route is established from the destination node to the source node using the communication channel as seen at operation 702. In this embodiment, any manner of establishing the new alternate route may be used.

As the route is established from destination to source, each of the nodes along the newly-established route has a port switched such that it will subsequently allow optical signals to be transmitted forward through the nodes once the entire path has been set up via the communication channel. This is illustrated at operation 704.

When the path has been established all the way back to the source node, the source node itself effects its switch, which causes the failed link to no longer be used, and the newly established route is switched into use. In this manner, by the time the source node is notified of the original link failure, the newly established path is already set up for use, and the source node need only perform its switch to immediately begin utilizing the new route.

Figure 8:
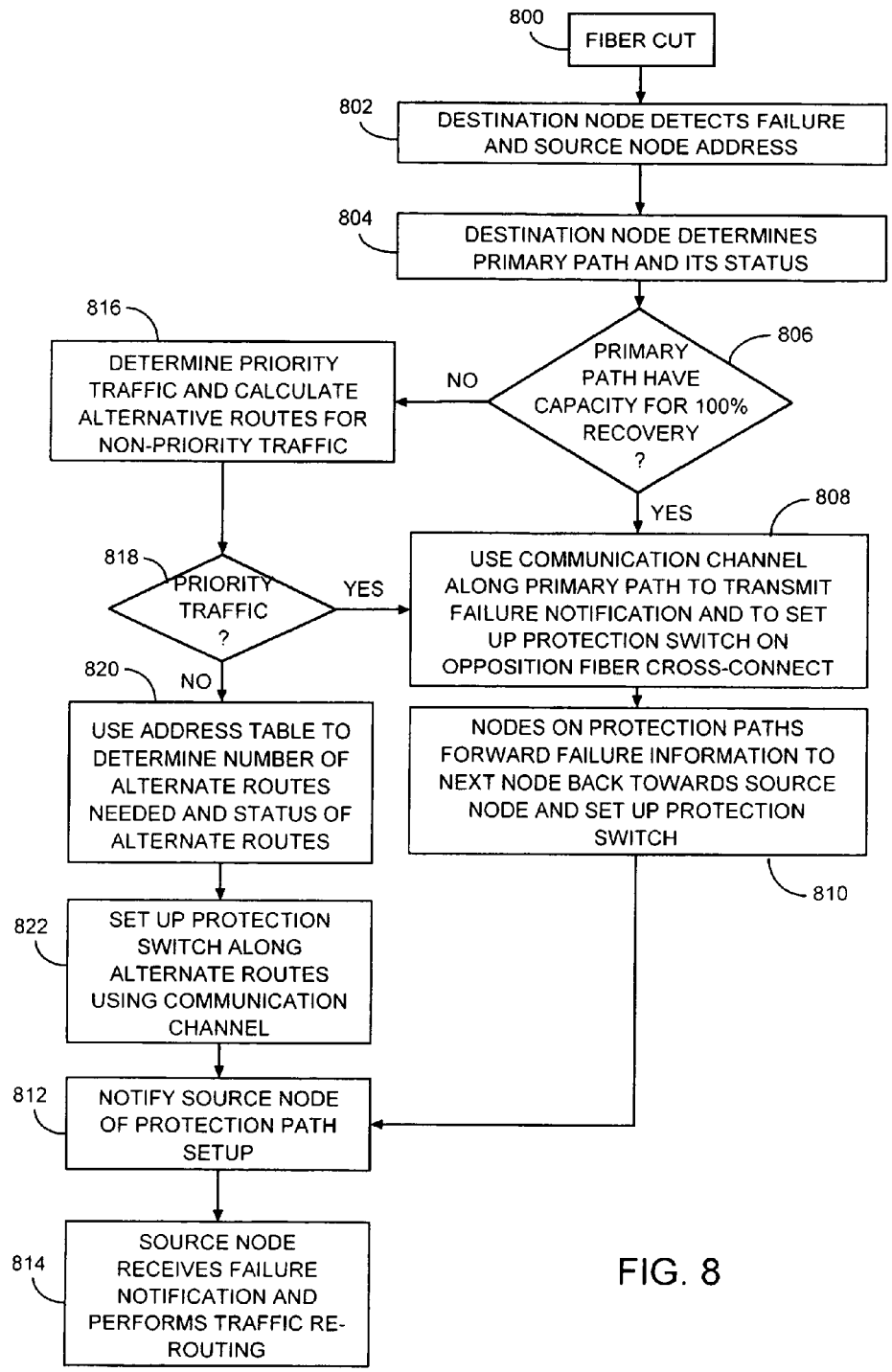
FIG. 8 is a flow diagram illustrating one embodiment of the invention wherein the BPSS protocol utilizes one or more backwards route selection methodologies.

FIG. 8 is a flow diagram illustrating one embodiment of the invention wherein the BPSS protocol utilizes one or more backwards route selection methodologies. In the embodiment of FIG. 8, a predetermined "primary" path is used upon detection of a failed link, and a dynamically-generated "alternate" path is used to the extent that the primary path is unable to accommodate all of the required optical bandwidth.

In the embodiment of FIG. 8, the primary path is the first choice of alternate paths upon detection of a failed link. If the primary path has available capacity, the path is setup along this primary path. If the primary path is unavailable or only partially available, an alternate path can be dynamically generated using the optical node address table. This provides multiple levels of bandwidth availability.

Referring now to FIG. 8, operation 800 represents a break in the fiber or other failure causing any disruption in the normal transmission of optical signals. In accordance with the invention, each optical node is assigned an address. The destination node detects the failure, and identifies the source node address as seen at operation 802. The destination node recognizes the loss of optical power at a port associated with the failed link, and thus can identify the address of the source node Upon detection of the failure at the destination node, the destination node initiates its task of reporting the failure to the source node identified by the address, and to the network management module via a communication channel.

In accordance with the embodiment illustrated in FIG. 8, there are two classes of protection, including a primary path protection and alternate path protection. The primary path is a predefined route for the optical signals to travel from a particular source node upon detection of a failure in the working path. Therefore, the predefined primary path does not require any computation to determine its protection route. No table look up is involved; for example, the path from node-A 202 to node-C 206 to node-B 204 in FIG. 2 is a predefined route requiring no computation or table look up. When the destination node determines that a failure on the working path has occurred, the destination node will find the primary path and determine its status, as seen at operation 804.

It is then determined at operation 806 whether the primary path has enough capacity for 100% recovery. If the primary path cannot recover the full bandwidth, alternate routes will be used, and the primary path will be used to recover the high priority traffic. Otherwise, no alternate routes will be necessary. Where the primary path has enough capacity for 100% recovery, the communication channel is used along the primary path to transmit the failure notification and to set up the protection switch on the opposition fiber cross-connect as illustrated at operation 808. Each of the nodes along the primary protection path forward this failure information in the direction from destination node to source node, and sets up its respective cross-connect switch accordingly as depicted at operation 810. When each of the nodes has been set up, the source node is notified 812 of the protection path setup as it receives 814 the failure notification and performs the traffic re-routing in accordance with the protection path setup.

Where the primary path does not have enough capacity to provide for full recovery as determined at decision operation 806, the traffic to be designated as high priority traffic is determined and the necessary alternate routes for non-priority traffic is calculated as seen at operation 816. What constitutes high priority traffic may be determined in advance, and may include real-time traffic or other mission critical traffic. By assigning high priority traffic to the primary path, it is ensured a path, where remaining traffic must be routed by dynamically ascertaining one or more available paths. If enough available capacity cannot be dynamically found on alternate paths, the remaining non-priority traffic may be discarded or otherwise disregarded. Therefore, in one embodiment of the invention, the highest priority traffic is assigned to the predetermined primary path to the extent possible, then to the alternate paths, and any remaining non-priority traffic is assigned to alternate paths or discarded if bandwidth is unavailable. This is illustrated at decision operation 818 where priority traffic is handled according to operation 808, where the communication channel is used along the primary path to transmit the failure notification and to set up the protection switch on the opposition fiber cross-connect, and where each of the nodes along the primary protection path forward this failure information in the direction from destination node to source node, and sets up its respective cross-connect switch accordingly as depicted at operation 810.

Traffic that is not priority traffic as determined at decision operation 818 finds alternate paths dynamically. At operation 820, the optical node address table is used to determine the number of alternate routes required to transmit the non-priority optical signals, and the status of these alternate routes is also determined from the optical node address table. Using the node status and node availability information from the table, the nodes along the alternate path(s) are set up and switched using the communication channel in a backwards fashion—from the destination node to the source node—as seen at operation 822. This is accomplished as previously described in connection with FIG. 5 using dynamic path generation. When each of the nodes has been set up, the source node is notified 812 of the protection path setup as it receives 814 the failure notification and performs the traffic re-routing in accordance with the protection path setup.

The protection path switches are effected using the fiber cross-connect (FXC) where possible. In other words, if there is enough fiber capacity to re-route the failed link, the switching occurs at the FXC level. However, if there is not enough spare fibers to perform all recovery at the FXC level, certain wavelengths may be re-routed at the optical cross-connect (OXC) level. The FXC and OXC portions of the optical nodes were discussed in connection with FIG. 4.

The communication channel discussed above may be any channel designated to carry the required status and fault information. In one embodiment of the invention, the communication channel is the channel dedicated to various traffic control functions, such as alarms, maintenance, control, monitoring and administration and other communication needs between two section terminating equipments. Status is updated on the communication channel every predetermined interval to maintain the status at each node, and to allow the optical node address table to be continually updated.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method, comprising:
    establishing a protection path for a failed link between first and second nodes in a mesh network, wherein a transfer of information from the first node to the second node is disrupted by the failed link;
    establishing an alternate path from the second node to the first node via a destination-to-source communication channel, wherein the destination-to-source communication channel is established through at least one alternate node beginning at the second node and ending at the first node;
    determining whether a node of the at least one alternate node has available capacity to allow information from the failed link to be rerouted;
    executing a switch function at the node of the at least one alternate node traversed by the destination-to-source communication channel to allow source-to-destination information traffic flow from the first node to the second node along the alternate path defined by the destination-to-source communication channel; and
    switching the information traffic flow at the first node from the failed link to the alternate path when the destination-to-source communication channel is established at the first node.

2. The method as in claim 1, further comprising:
    transferring the information as optical signals, wherein the mesh network comprises an optical mesh network.

3. The method as in claim 2, further comprising:
    transmitting multiple optical signals each at a different wavelength on a single optical fiber, wherein the optical mesh network comprises an optical mesh network incorporating wavelength division multiplexing.

4. The method of claim 3, wherein executing a switch function comprises optically switching the wavelengths of one or more of the optical signals of the failed link onto optical fibers establishing the alternate path.

5. The method of claim 4, wherein optically switching one or more of the optical signals of the failed link comprises switching the one or more optical signals to alternate ports of an optical cross-connect.

6. The method of claim 3, wherein executing a switch function comprises switching the optical signals of failed optical fibers onto alternate optical fibers to establish the alternate path.

7. The method of claim 6, wherein switching one or more of the optical signals of the failed fibers onto alternate optical fibers comprises collectively switching the one or more optical signals associated with the optical fibers of the failed link to different ports of a fiber cross-connect.

8. The method of claim 1, wherein establishing an alternate path from the second node to the first node comprises routing the destination-to-source communication channel along a predetermined path of the alternate nodes.

9. The method of claim 1, wherein establishing an alternate path from the second node to the first node comprises routing the destination-to-source communication channel along a dynamically-generated path of the alternate nodes.

10. The method of claim 9, wherein routing the destination-to-source communication channel along a dynamically-generated path comprises monitoring a node status associated with potential alternate nodes, and selecting the potential alternate node for inclusion into the dynamically-generated path when its respective node status exhibits a predefined capacity of available information bandwidth.

11. The method of claim 10, wherein monitoring a node status comprises monitoring a node address table of which the node status is a field thereof.

12. The method of claim 11, wherein monitoring a node address table comprises monitoring the node status of at least the next two hops of nodes.

13. The method of claim 1, further comprising:
detecting the failed link at the second node.

14. The method of claim 13, wherein detecting the failed link comprises monitoring for a loss of optical power at a corresponding port of the node, and detecting the failed link when the optical power reaches a predetermined threshold.

15. The method of claim 1, further comprising:
initiating the transfer of information from the first node, wherein the first node is an information-originating source node.

16. The method of claim 1, further comprising:
initiating the transfer of information from an information-originating source node;
providing the first node as an intermediate source node between the failed link and the information-originating source node.

17. The method of claim 1, further comprising:
ultimately directing the transfer of information to the second node, which is a targeted destination node.

18. The method of claim 1, further comprising:
ultimately directing the transfer of information to a targeted destination node; and
providing the second node as an intermediate source node between the failed link and the targeted destination node.

19. The method of claim 1, further comprising:
transmitting a failure notification message from the second node to the first node via the destination-to-source communication channel by way of the alternate path.

20. The method of claim 19, wherein switching the optical traffic flow at the first node comprises switching the information traffic flow to the alternate path when the first node receives the failure notification message, and allowing the disrupted transfer of information to be switched to the alternate path when the first node is apprised of the failed link.

21. The method of claim 19, further comprising:
transmitting the failure notification message from the second node to the first node through the alternate node; and
directing, by the failure notification message, the one or more alternate nodes to execute the switch function, to establish the alternate path when the failure notification message reaches the source node.

22. The method of claim 1, further comprising:
dedicating one or more wavelengths of the destination-to-source communication channel to transmitting management information, including a link failure notification.

23. A network protection configuration, comprising:
an optical fiber network comprising
a plurality of optical network nodes each coupled to transmit and receive optical signals carried on distinct wavelengths on optical fibers of the optical fiber network, and
a source node attempting to transmit the optical signals via a failed transmission path and a destination node detecting the failed transmission path; and
a communication channel established from the destination node to the source node to transmit a path failure notification, wherein a route established by the destination-to-source communication channel traversing one or more of the optical network nodes defines an alternate transmission path, and wherein the network nodes defining the alternate transmission path are configured to be switched based on available capacity to allow information from the failed transmission path to be rerouted in response to the path failure notification to facilitate source-to-destination transmission of the optical signals from the failed transmission path along the alternate path.

24. The network protection configuration as in claim 23, wherein each of the optical network nodes further comprises memory to store an optical node address table, wherein the optical node address table is configured to maintains status information for surrounding optical network nodes being within at least two hops of the optical network node.

25. The network protection configuration as in claim 24, wherein the status information comprises an optical node address for the surrounding optical network nodes.

26. The network protection configuration as in claim 24, wherein the status information comprises node availability information for the surrounding optical network nodes.

27. The network protection configuration as in claim 24, wherein the status information comprises node bandwidth capacity information for the surrounding optical network nodes.

28. The network protection configuration as in claim 23, wherein each of the optical network nodes further comprises a fiber cross-connect circuit coupled to one or more of the optical fibers of the failed transmission path to switch the optical signals corresponding to a failed optical fiber to fiber cross-connect output ports to route the optical signals corresponding to the failed optical fiber to targeted optical fibers along the alternate path.

29. The network protection configuration as in claim 28, wherein each of the optical network nodes further comprises an optical cross-connect circuit coupled to the fiber cross-connect circuit to switch at least one of the optical signals corresponding to the failed transmission to optical cross-connect output ports to route the at least one optical signal to targeted fibers in the fiber cross-connect for ultimate transmission along the alternate path.

30. The network protection configuration as in claim 23, wherein the optical fiber network is configured to wavelength division multiplex multiple optical signals such that the multiple optical signals are each transmitted at a different wavelength on a single fiber.

31. The network protection configuration as in claim 23, further comprising:
a monitoring unit configured to detect the failed transmission path at the destination node.

32. The network protection configuration as in claim 23, wherein each of the optical network nodes comprises a switching unit configured to reroute the optical signals corresponding to the failed transmission to optical fibers along the alternate path in response to the path failure notification.

33. A network protection configuration, comprising:
an optical fiber network comprising a plurality of optical network nodes each coupled to transmit and receive optical signals carried on distinct wavelengths on optical fibers of the optical fiber network,
wherein each of the plurality of optical network nodes comprises:
a fiber cross-connect circuit coupled to receive one or more of the optical fibers of the optical fiber network and to switch the optical signals on the optical fibers to particular output ports of the fiber cross-connect to route the optical signals on the optical fibers to targeted optical fibers;
an optical cross-connect circuit coupled to receive one or more of the optical signals and to switch the optical signals to particular output ports of the optical cross-connect to route the optical signals to targeted ones of the optical fibers;
destination-to-source communication channel established from a destination node detecting a failed transmission path to a source node to transmit a failed path notification,
wherein a route established by the destination-to-source communication channel traversing one or more of the optical network nodes defines an alternate transmission path based on available capacity to allow information from the failed transmission path to be rerouted, and
wherein the fiber cross-connect and optical cross-connect circuits of the network nodes defining the alternate transmission path are switched in response to the failed path notification to facilitate source-to-destination transmission of the optical signals from the failed transmission path along the alternate path.

34. A method, comprising:
establishing a protection path for a failed optical link between a source node and a destination node in an optical wave division multiplexing mesh network, wherein a transfer of optical signals from the source node to the destination node is suspended by the failed optical link;
detecting the failed optical link at the destination node by recognizing the loss of optical power at destination node cross-connect ports;
transmitting a link failure signal via a communication channel from the destination node detecting the failed link to the source node through at least one alternate node;
determining whether a node of the at least one alternate node has available capacity to allow transmission of the suspended optical signals to be rerouted;
configuring a cross-connect switch at each of the alternate nodes receiving the link failure signal, comprising cross-connecting input ports to output ports of the cross-connect switch such that a source-to-destination protection path for transmission of the suspended optical signals is established as the link failure signal is transmitted from the destination node to the source node; and
switching the suspended optical signals from the failed optical link to the source-to-destination protection path upon receipt of the link failure signal at the source node, wherein the source-to-destination protection path is set up using a destination-to-source communication channel.

35. The method of claim 34, further comprising:
transmitting the link failure signal from the destination node through the nodes; and
directing, by the link failure signal, the node to perform an appropriate switching function such that the source-to-destination protection path is set up by a time that the link failure signal reaches the source node.

36. A network node, comprising:
a port configured to receive information from a destination-to-source communication link;
a control circuit operably connected to the port and configured to a cross-connect section; and
the cross-connect section operably connected to the control circuit and configured to direct network traffic flow between a first node and a second node,
wherein the control circuit is configured, upon receipt of the information from a destination-to-source communication link, said information identifying that a protection path for a failed link between the first and the second node is to be established based on available capacity in the protection path, to cause the cross-connect section to execute a switch function to allow source-to-destination information traffic flow along a path defined by the information received from destination-to-source communication channel.

37. The network node of claim 36, wherein the node comprises an optical wavelength division multiplexing mesh network node.

38. A network node, comprising:
reception means for receiving information from a destination-to-source communication link;
cross-connect means for directing network traffic flow between a first node and a second node,
control means, operably connected to the reception means and the cross-connect means, for, upon receipt of the information from a destination-to-source communication link, said information identifying that a protection path for a failed link between the first and the second node is to be established based on available capacity in the protection path, causing the cross-connect section to execute a switch function to allow source-to-destination information traffic flow along a path defined by the information received from destination-to-source communication channel.

* * * * *